Patented Oct. 9, 1951

2,570,269

UNITED STATES PATENT OFFICE 2,570,269

STABILIZATION OF COPOLYMERIZABLE POLYESTER-MONOMER MIXTURE BY MEANS OF A SALT OF A SUBSTITUTED HYDRAZINE

Earl E. Parker, Milwaukee, Wis., assignor to Pittsburgh Plate Glass Company, Allegheny County, Pa., a corporation of Pennsylvania No Drawing. Application March 25, 1948, Serial No. 17,098

23 Claims. (Cl. 260—45.4)

The present invention relates to the preservation of mixtures of polymerizable compounds and it has particular relation to the preservation of mixtures of compounds which by polymerization tend to form infusible, insoluble gels or resins.

One object of the invention is to provide a process of treating such mixtures whereby to obviate premature setting or gelling thereof while they are in storage.

A second object is to provide a process of the foregoing type which will admit a readily and complete polymerization of the polymerizable mixtures at the conclusion of the storage period.

These and other objects of the invention will be apparent from consideration of the following specification and the appended claims.

It has heretofore been proposed to prepare resinous products by copolymerizing in suitable molds, mixtures of glycol esters of unsaturated dicarboxylic acids and unsaturated hydrocarbons such as styrene. By such polymerizations it was possible to obtain clear, hard, infusible and relatively insoluble products of high technical merit easily, quickly and at comparatively low temperatures.

For a clearer concept of the broader aspects of the invention reference may be had to a typical structural formula of the polyesters constituting a component of the copolymer. This formula is approximately as follows:

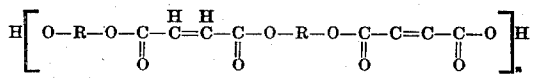

In this basic formula R is the nucleus or residue of a glycol such as ethylene glycol, di or triethylene glycol or 1,2 or 1,3 propylene glycol. In the formula $n$ represents the number of times the basic ester unit is repeated. These ester chain molecules are best formed by esterification of alpha-beta unsaturated alpha-beta dicarboxylic acids and glycols under non-oxidizing conditions. The acid number of the ester varies with the number of ester units in the chain. Triethylene maleate of an acid number of 105 contains 2.32 units (average) per molecule. At an acid value of 37.4 the average units per molecule equals 6.47.

It is obvious that all of these esters are linear polymers and that they usually contain a plurality of active carbon oxygen conjugate groups of the type —C=C—C=O. In accordance with Industrial and Engineering Chemistry, December 1939, page 1512, and again the same publication, January 1940, page 64, it has been observed that these carbon oxygen conjugate groups are capable of addendum reaction with hydrocarbons and esters of the type

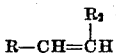

($R_2$ being H or alkyl) containing active but non-conjugate vinyl groups or double bonds to provide cross linkage between ester chain molecules. The polyesters can thus be cured to a hard, infusible, insoluble state quickly and at moderate temperatures.

A difficulty in the processes as heretofore proposed has involved the rapidity with which the mixtures copolymerized to form hard, infusible and insoluble products even during periods of storage at atmospheric temperatures. For example, within a period of a few days or, indeed, in some cases within a period of a few hours the mixtures even at room temperatures would begin to set and gel in an objectionable manner.

According to Ellis Patent 2,255,313, it is proposed to retard the premature setting of polymerizable mixtures of this type by inclusion of fibrous material such as cellulose fibers. This, of course, is undesirable, especially where transparent products are to be formed.

The present invention is based upon the discovery that stabilization of copolymerizable mixtures of polyesters of ethylenically unsaturated dicarboxylic acids and olefinically unsaturated monomers capable of cross-linking the polyester molecules can be effected against premature gelation by incorporating with the copolymerizable mixture in the substantial obsence of catalysts of copolymerization an appropriate salt of a substituted hydrazine.

These hydrazine salts when employed even in very small percentage effectively stabilize the copolymerizable mixtures of esters and styrene so that in most instances they may be stored at room temperature or even above for months without any appreciable tendency prematurely to gel or set. Although the mixtures withstand storage for long periods of time without premature gelation, it is found that when a catalyst of addendum polymerization such as a peroxide, e. g. benzoyl peroxide, tertiary butyl hydroperoxide, cyclohexyl hydroperoxide, acetyl peroxide, lauroyl peroxide or the like is added, in a small amount, e. g. 0.1 to 5% based upon the polymerizable components of the mixture, polymerization can be effected quite rapidly at temperatures of 75° to 200° C. or thereabouts.

The invention, then, comprises the stabilization during periods of storage of mixtures of (A)

polyesters of unsaturated alpha-beta dicarboxylic acids and dihydroxy alcohols and containing a plurality of carbon-oxygen conjugately unsaturated groups —C=C—C=O and (B) a non-conjugate or olefinically unsaturated compound

(R being H or alkyl), capable of addition reaction to cross link the ester molecules. In most but not all instances the unsaturation of the dicarboxylic acid is alpha-beta. A few unsaturated acids e. g. cis or trans 3,6 endomethylene $\Delta^4$ tetrahydrophthalic acid or their anhydrides, when they exist, are outside of this alpha-beta ethylenic class.

The preparation of linear polyesters suitable for copolymerization with vinyl compounds is described in the articles in Industrial and Engineering Chemistry already identified. In general, esterification should be conducted under an inert atmosphere and until the acid number is appropriately reduced, e. g. to a range of about 20 to 100. An acid number of 50 would be a good average.

The preparation of a typical mixed ester is illustrated by the preparation of the mixed ester of diethylene glycol with maleic and phthalic anhydrides. This alkyd was prepared by admixing 212 lbs. (2 mols) of diethylene glycol, 98 lbs. (1 mol) maleic anhydride, 148 lbs. (1 mol) phthalic anhydride, 21 lbs. xylol. These were charged into a reaction vessel equipped with a stirrer and an inlet for inert gases. The apparatus also included a thermometer and a reflux condenser by means of which the water from the reaction was separated off and the xylol was returned to the reaction zone. The charge was heated in accordance with the following time temperature schedule:

| Time: | Temperature, °C. |
|---|---|
| 0 to 2 hours | 150 |
| 2 to 20 hours | 150 to 190 |

Of course, higher temperatures might be employed so long as they were not so high as to result in decomposition or gelation of the charge or the product. Lower temperatures would require longer periods of time.

In order to prepare stable but readily polymerizable mixtures which could be stored for long periods of time without appreciable gelation or premature polymerization, various hydrazine salts were incorporated in minute amounts into copolymerizable mixtures of esters and polymerizable olefinically unsaturated or vinylic compounds.

An appropriate copolymerizable mixture suitable for the application of the principles of the invention may contain the ingredients approximately in the following proportions:

| I. Polyester | parts by weight | 50 |
|---|---|---|
| II. Olefinically unsaturated monomer | parts by weight | 10 to 100 |
| III. Hydrazine salt, per cent by weight | | .01 to 2.0 |

The mixture should be free of peroxide catalysts of polymerization during any appreciable period of storage since the catalyzed mixtures tend strongly to gel even at atmospheric temperatures.

The polyester component (I) includes the polyesters of unsaturated dicarboxylic acids such as maleic, methyl maleic, fumaric, itaconic, cis or trans 3,6 endomethylene $\Delta^4$ tetrahydrophthalic acid, citraconic, etc. and a glycol such as ethylene glycol, diethylene glycol, triethylene glycol, 1,3 or 1,2 propylene glycol or ethers of propylene glycols obtained by condensation of two or three mols thereof. Other glycols are contemplated. The unsaturated acids of the polyester component are generally alpha,beta dicarboxylic and most usually they are alpha,beta ethylenically unsaturated, but a few acids such as cis or trans 3,6 endomethylene $\Delta^4$ tetrahydrophthalic acid are available. A part of the unsaturated dicarboxylic acid may be replaced by saturated dicarboxylic acids such as succinic acid or chlorosuccinic acid, adipic acid, azelaic acid, phthalic acid, tetrachlorophthalic acid and others which of themselves are incapable of addition reaction with a vinylic monomer, but readily enter into the polyester chain by esterification with the glycolic component. These functionally saturated dicarboxylic acids may be employed mol for mol with the unsaturated dicarboxylic acid or they may comprise 25 to 80% of the acid mixture upon a molar basis. Conversely the range of the unsaturated dicarboxylic acids would be from 20 to 75% upon a molar basis. Small amounts of long chain fatty acids such as linoleic or linolenic or oleic acid may be included in the mixture; this component being in a range of 1 mol to 2 to 12 mols of the dicarboxylic acid or acids.

Preferably the polyester component will be of an acid value of about 10 to 100 dependent upon the degree of esterification and the viscosity desired therein. Obviously the lower the acid value, the higher will be the molecular weight and other factors being equal, the higher will be the viscosity.

The olefinically unsaturated monomer of vinylic component (II) of the mixture may be selected from a large class including styrene and its homologues including methyl styrene, divinyl benzene, indene, esters such as vinyl acetate, acrylates such as methyl methacrylate, methyl acrylate, allyl acetate, esters of dicarboxylic acids and allyl alcohol, e. g., diallyl phthalate, diallyl succinate, diallyl adipate, diallyl sebacate, vinyl chloride, diethylene glycol bis (allyl carbonate), triallyl phosphate and numerous monoalkyl esters such as are disclosed in a like function in Patents 2,308,495 or 2,409,633. Any one or mixtures of two or more of these may be employed as component II. The invention contemplates in its broader term the use of any vinylic monomer capable of cross-linking the polyesters of maleic or fumaric acid or equivalents and glycols such as diethylene glycol or 1,2 propylene glycol by addition at the points of unsaturation in the polyester chain. This component II usually will comprise about 10 to 60% of the mixture.

Appropriate salts of hydrocarbon substituted derivatives of hydrazine for incorporation with copolymerizable mixtures of the type previously described may be of the general formula:

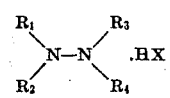

in which at least one of the radicals $R_1$, $R_2$, and $R_3$ is hydrocarbon, e. g. phenyl, naphthyl, or allyl, e. g. ethyl, methyl, propyl or the like. One or both of the remaining two radicals in the group $R_1$, $R_2$ and $R_3$ may be hydrocarbon such as phenyl, naphthyl, methyl, ethyl or propyl; and such as are not hydrocarbon, are hydrogen. $R_4$ usually will be hydrogen. X will be a negative radical namely chlorine, bromine, iodine, sulphate, phosphate. This class obviously comprises the strong mineral acids.

The inhibitor component (III) is not critical as to proportions. A very little is sufficient for most purposes as will be evident from the examples, but much more is permissible so long as the resin is not excessively diluted. A range of about .01 to 2.0% covers most requirements, with present needs being met by about 0.1 to 0.5%.

The following constitute specific examples illustrating the preparation of stable mixtures in accordance with the provisions of the present invention:

Examples (1)

2 parts propylene maleate phthalate
1 part diethylene glycol bis (allyl carbonate)

This mixture gelled in one day at 150° F. and in 30 days at 70° F.

(2)

2 parts propylene maleate phthalate
1 part diethylene glycol bis (allyl carbonate)
0.015 phenyl hydrazine hydrochloride This mixture was stable for more than 18 days at 150° F. and for six months at 70° F. Diethylene glycol bis (allyl carbonate) is described in U. S. Patent 2,370,565. The bis (allyl carbonate) esters of other glycols such as ethylene glycol, triethylene glycol, 1,2 or 1,3 propylene glycol can be substituted for diethylene glycol bis allyl carbonate in this and Examples 1 and 7 to 16 inclusive. The use of other carbonate esters such as $$CH_2=CH-CH_2-O-\underset{\underset{O}{\|}}{C}-\underset{H}{N}-C_2H_4-O\underset{\underset{O}{\|}}{C}=O$$
$$CH_2=CH-CH_2-O-\underset{\underset{O}{\|}}{C}-N-C_2H_4-O$$

disclosed in application Serial No. 521,444, filed February 7, 1944, in the name of Franklin Strain, now issued as Patent No. 2,397,631, is also contemplated. These are merely substituted for the diethylene glycol bis (allyl carbonate) in the examples noted.

(3)

2 parts propylene maleate phthalate
1 part methyl methacrylate

This mixture gelled in less than one day at 150° F. and in 30 days at 70° F.

(4)

2 parts propylene maleate phthalate
1 part methyl methacrylate
.015 part phenyl hydrazine hydrochloride This mixture did not gel in 40 days at 150° F. and 180 days at 70° F.

(5)

2 parts propylene maleate phthalate
1 part vinyl acetate

This mixture gelled in one day at 150° F. and in 30 days at 70° F.

(6)

2 parts propylene maleate phthalate
1 part vinyl acetate
.015 part phenyl hydrazine hydrochloride This mixture did not gel in 40 days at 150° F. and in 180 days at 70° F. In Examples 1 to 6 inclusive, propylene maleate phthalate may be replaced in part or completely by propylene maleate tetrachlorophthalate.

(7)

2 parts diethylene fumarate
1 part diethylene glycol bis (allyl carbonate)

This mixture gelled in one day at 150° F. and in 30 days at 70° F.

(8)

2 parts diethylene fumarate
1 part diethylene glycol bis (allyl carbonate)
.015 part phenyl hydrazine hydrochloride This mixture was stable for more than 50 days at 150° F. and 180 days at 70° F.

(9)

1 part propylene maleate
1 part diethylene glycol bis (allyl carbonate)

This mixture gelled in 1 day at 150° F and in 30 days at 70° F.

(10)

1 part propylene maleate
1 part diethylene glycol bis (allyl carbonate)
0.01 part phenyl hydrazine hydrochloride This mixture was stable for more than 50 days at 150° F. and 180 days at 70° F.

(11)

2 parts propylene azelate maleate
1 part diethylene glycol bis (allyl carbonate)

This mixture gelled in 1 day at 150° F. and in 30 days at 70° F.

(12)

2 parts propylene azelate maleate
1 part diethylene glycol bis (allyl carbonate)
.003 to 0.06 part phenyl hydrazine hydrochloride This mixture was stable for 20 days at 150° F. and 180 days at 70° F.

(13)

1 part propylene maleate phthalate
2 parts propylene azelate maleate
1 part diethylene glycol bis (allyl carbonate)

This mixture gelled in 1 day at 150 F. and in 30 days at 70° F.

(14)

1 part propylene maleate phthalate
1 part diethylene glycol bis (allyl carbonate)
.003 to .04 part phenyl hydrazine hydrochloride This mixture was stable for 20 days at 150° F. and 120 days at 77° F.

(15)

2 parts diethylene fumarate adipate
1 part diethylene glycol bis (allyl carbonate)

This mixture gelled in 1 day at 150° F. and in 30 days at 70° F.

(16)

2 parts diethylene fumarate adipate
1 part diethylene glycol bis (allyl carbonate)
0.015 to 0.15 part phenyl hydrazine hydrochloride This mixture was stable for 20 days at 150° F. and 120 days at 77° F.

(17)

2 parts diethylene fumarate
1 part diallyl phthalate

This mixture gelled in 1 day at 150° F. and in 12 days at 70° F.

(18)

2 parts diethylene fumarate
1 part diallyl phthalate
.015 part phenyl hydrazine hydrochloride This mixture was stable for more than 50 days at 150° F. and 180 days at 70° F.

(19)

1 part propylene maleate
1 part diallyl phthalate

This mixture gelled in 1 day at 150° F. and in 10 days at 70° F.

(20)

1 part propylene maleate
1 part diallyl phthalate
0.002 part phenyl hydrazine hydrochloride This mixture was stable for over 50 days at 150° F. and 180 days at 70° F.

(21)

2 parts diethylene fumarate phthalate
1 part diallyl phthalate

This mixture gelled in 2 days at 150° F. and in 30 days at 70° F.

(22)

2 parts diethylene fumarate phthalate
1 part diallyl phthalate
.015 part phenyl hydrazine hydrochloride This mixture was stable for more than 10 days at 150° F. and 120 days at 70° F.

(23)

2 parts propylene azelate maleate
1 part diallyl phthalate

This mixture gelled in 1 day at 150° F. and in 30 days at 70° F.

(24)

2 parts propylene azelate maleate
1 part diallyl phthalate
.003 to 0.1 part phenyl hydrazine hydrochloride This mixture was stable for 40 days at 150° F. and 180 days at 77° F.

(25)

2 parts propylene adipate fumarate
1 part diallyl phthalate

This mixture gelled in 1 day at 150° F. and in 30 days at 70° F.

(26)

2 parts propylene adipate fumarate
1 part diallyl phthalate
0.003 to 0.03 part phenyl hydrazine hydrochloride This mixture was stable for 30 days at 150° F. and 180 days at 70° F.

(27)

1 part propylene maleate phthalate
1 part diallyl phthalate

This mixture gelled in 1 day at 150° F. and 15 days at 70° F.

(28)

1 part propylene maleate phthalate
1 part diallyl phthalate
.002 to .01 part phenyl hydrazine hydrochloride This mixture was stable for 15 days at 150° F. and 150 days at 70° F.

(29)

2 parts diethylene fumarate
1 part vinyl acetate

This mixture gelled in 1 day at 150° F. and in 30 days at 70° F.

(30)

2 parts diethylene fumarate
1 part vinyl acetate
.015 part phenyl hydrazine hydrochloride This mixture was stable for over 50 days at 150° F. and 180 days at 70° F.

(31)

2 parts diethylene maleate phthalate
1 part vinyl acetate

This mixture gelled in 1 day at 150° F. and in 30 days at 70° F.

(32)

2 parts diethylene maleate phthalate
1 part vinyl acetate
.015 part phenyl hydrazine hydrochloride This mixture was stable for over 50 days at 150° F. and 180 days at 70° F.

(33)

1 part vinyl acetate

This mixture gelled in 1 day at 150° F. and in 25 days at 70° F.

(34)

2 parts propylene azelate maleate
1 part vinyl acetate
.001 to .01 part phenyl hydrazine hydrochloride This mixture was stable for 10 days at 150° F. and 120 days at 70° F.

(35)

2 parts propylene adipate fumarate
1 part vinyl acetate

This mixture gelled in 1 day at 150° F. and in 27 days at 70° F.

(36)

2 parts propylene adipate fumarate
1 part vinyl acetate
.001 to .01 part phenyl hydrazine hydrochloride This mixture was stable for 30 days at 150° F. and 180 days at 70° F.

(37)

2 parts diethylene maleate phthalate
1 part methyl methacrylate

This mixture gelled in 1 day at 150° F. and in 30 days at 70° F.

(38)

2 parts diethylene maleate phthalate
1 part methyl methacrylate
0.015 part phenyl hydrazine hydrochloride This mixture was stable for 11 days at 150° F. and over 90 days at 70° F.

Obviously other salts of hydrazine derivatives of the formula:

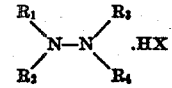

where at least one of the groups $R_1$, $R_2$ and $R_3$ are hydrocarbon and X is a negative radical such as chlorine, bromine or iodine may be substituted for phenyl hydrazine hydrochloride in the preceding examples.

It is to be understood that in the preparation of stabilized copolymerizable mixtures, the salt of the hydrazine derivative is dissolved at least in part in the copolymerizable mixture. In order to incorporate the inhibitor component (III) into the polymerizable mixture in the preceding or similar examples, it is preferred to dissolve the inhibitor in all or a portion of the polyester component bfeore the olefinically unsaturated monomer is added. The monomer may then be added and the mixture cooled, preferably promptly. The inhibitor may be added to the cold polyester and the mixture heated until the inhibitor disappears in solution. Any reasonable degree of overheating if not so high as to char or darken the mixture or not so prolonged as to produce gelation is permissible. The temperature required will of course vary for different polyesters and different hydrazine salts. In some instances solution may occur at room temperature. Temperatures up to 100 or 200° C. are contemplated. It is also contemplated to dissolve the stabilizer in a mutual solvent for it and the polyester or the olefinically unsaturated monomer and to add the solution to the polyester or the mixture of the polyester and the monomer at normal or elevated temperatures. The stabilized mixtures should be free of catalysts such as peroxide type catalysts designed to effect copolymerization of the mixtures. When it is desired to use the stabilized mixture, the catalyst in appropriate amounts is added and the mixture is then copolymerized in any desired manner, usually by application of heat. In some instances the heat of polymerization may become sufficient to effect completion of the polymerization reaction without application of external heat.

A trace of quinone, e. g. about 1% based on the salt content of the mixture can be added, further to stabilize the mixtures in the preceding examples but in most cases stability is adequate without it.

From the foregoing examples it will be apparent that polymerizable but uncatalyzed mixtures of glycol esters of alpha-beta unsaturated, alpha-beta dicarboxylic acids and monomeric olefinic compounds capable of effecting cross-linkage of the polyester nuclei can readily be stabilized with salts of hydrazine compounds to provide mixtures that can be stored without gelling for long periods of time.

It is to be appreciated that in order to effect a rapid cure of the mixtures of polyester and the olefinically unsaturated monomer, a catalyst of the addition reaction involved in copolymerization is usually desirable. However, in some instances, e. g. where high curing temperatures or long curing times, or ultra-violet irradiation are available, catalysts may be omitted.

Appropriate catalysts include peroxides such as:

Benzoyl peroxide
Tertiary butyl hydroperoxide
Cyclohexyl hydroperoxide
Acetyl peroxide
Lauroyl peroxide These are merely typical, others are available. The catalysts will usually be employed within a range of .01 to 5% e. g. 1% of the mixture. Preferably the catalyst is added shortly before the mixture is to be polymerized.

Other types of catalysts such as are employed as accelerators of rubber vulcanization or as rubber preservatives, obtained by condensation of amines and aldehydes, e. g. formaldehyde or acetaldehyde or butyraldehyde and analine or toluidine may be employed. Many of these are described in The Chemistry of Synthetic Resins, vol. I, pages 704–711, Carleton Ellis, copyrighted 1935, Reinhold Publishing Corporation. Mixtures of the two types of catalyst, e. g. 1% of benzoyl peroxide or tertiary butyl hydroperoxide, with butyraldehyde-aniline may be employed.

In order to promote the polymerization of a mixture such as 1 to 38 inclusive, a catalyst, e. g. benzoyl peroxide or any of the others in an amount of .1 to 5% is added and the mixture is heated up to an appropriate temperature, for example, to about 93° C. Lower temperatures, say 75° C. may also be employed. By heating at this latter temperature for a period of about an hour, the resin can be polymerized to the setting stage. Subsequently, it can be rendered harder and more durable by baking at a temperature of about 125 to 150° C. Of course, higher temperatures of baking can be employed provided they are not so high as to char or discolor the product. The products normally will be clear and strong. The polymerizable mixtures may be cast and cured in suitable molds with or without pressure.

Fillers such as cellulose fibers, asbestos and glass fibers can be added to the polymerizable mixtures in amounts, for example, up to 300% or more based upon the polymerizable liquids. Fabrics of glass fibers can also be impregnated or coated with the polymerizable mixtures. Mixtures of fibrous material and resin constituents can be heated under pressure to form hard, strong bodies of appropriate form.

Plasticizers such as dimethyl phthalate can also be added to the polymerizable mixtures in amounts, for example, of 5 to 40% based upon polymerizable constituents.

The polymerizable mixtures can be applied as coatings to metal, wood, paper, cotton or other cloth and cured in situ to form protective films.

The examples given herein are to be regarded merely as illustrating the principles of the invention. It will be apparent to those skilled in the art that numerous modifications may be made therein without departure from the spirit of the invention or the scope of the appended claims.

This application is in part a continuation of my prior application Serial No. 630,551, filed November 23, 1945, now abandoned.

I claim:

1. As a new composition of matter, a copolymerizable mixture of an alpha-beta ethylenically unsaturated, alpha-beta dicarboxylic acid polyester of a dihydric alcohol and an ethylenically unsaturated monomer capable of cross-linking the polyester molecules at the points of unsaturation therein, the mixture being free of added catalysts of polymerization and being stabilized against premature gelation during storage by a small stabilizing amount of a salt of the formula:

in which at least one of the radicals $R_1$, $R_2$ and $R_3$ is hydrocarbon, such radicals of the group $R_1$, $R_2$ and $R_3$, as are not hydrocarbon being hydrogen, X being the negative radical of a mineral acid of a class consisting of HCl, HBr, HI, H₂SO₄, and H₃PO₄.

2. As a new composition of matter, a copolymerizable mixture of an alpha-beta ethylenically unsaturated, alpha-beta dicarboxylic acid polyester of a dihydric alcohol and an ethylenically unsaturated monomer capable of cross-linking the polyester molecules at the points of unsaturation therein, the mixture being free of added catalysts of polymerization and being stabilized against premature gelation during storage by a small stabilizing amount of a salt of the formula:

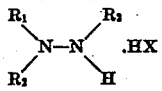

in which at least one of the radicals $R_1$, $R_2$ and $R_3$ is hydrocarbon, such radicals of the group $R_1$, $R_2$ and $R_3$, as are not hydrocarbon being hydrogen, X being halogen.

3. As a new composition of matter a copolymerizable mixture of an alpha-beta ethylenically unsaturated alpha-beta dicarboxylic acid polyester of a dihydric alcohol and an ethylenically unsaturated monomer capable of cross-linking the polyester molecules at the points of unsaturation in said polyester, the mixture being free of added catalysts of polymerization and being stabilized against premature gelation during storage by small stabilizing amount of phenyl hydrazine hydrochloride.

4. As a new composition of matter a copolymerizable mixture of an alpha-beta ethylenically unsaturated, alpha-beta dicarboxylic acid polyester of a dihydric alcohol and an ethylenically unsaturated monomer capable of cross-linking the polyester molecules at the points of unsaturation therein, said mixture being free of added catalysts of polymerization and being stabilized against premature gelation during storage by .01 to 2% by weight of a salt of a hydrazine derivative of the formula:

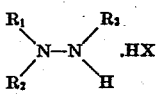

where at least one of the radicals $R_1$, $R_2$ and $R_3$ is hydrocarbon, the remaining radicals of the group $R_1$, $R_2$ and $R_3$ which are not hydrocarbon being hydrogen, X being halogen.

5. As a new composition of matter a copolymerizable mixture of (A) a polyester of a dihydric alcohol and a dicarboxylic acid, 20 to 75% upon a molar basis of the acid being alpha-beta ethylenically unsaturated and (B) an ethylenically unsaturated monomer capable of cross-linking the polyester molecules at points of unsaturation, the mixture being free of added catalysts of polymerization and being stabilized against premature gelation during storage by a small stabilizing amount of a compound of the formula:

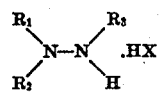

where at least one of the radicals of the group $R_1$, $R_2$ and $R_3$, is hydrocarbon, the remaining radicals of the group being hydrogen, X being halogen.

6. As a new composition of matter a copolymerizable mixture of (A) a polyester of a dihydric alcohol and a dicarboxylic acid at least 20% thereof upon a molecular basis being alpha-beta ethylenically unsaturated and (B) an ethylenically unsaturated monomer capable of cross-linking the polyester molecules at points of unsaturation, the mixture being free of added catalysts of polymerization and being stabilized against premature gelation during storage by a small stabilizing amount of phenyl hydrazine hydrochloride.

7. As a new composition of matter a copolymerizable mixture of (A) 50 parts by weight of a polyester of a dihydric alcohol consisting of carbon, hydrogen and oxygen and a mixture of an alpha-beta ethylenically unsaturated alpha-beta dicarboxylic acid and a saturated dicarboxylic acid the first mentioned acid constituting at least 20% of the mixture of acids upon a molar basis and (B) 10 to 100 parts of an ethylenically unsaturated monomer capable of cross-linking the polyester molecules at the points of unsaturation in said polyester, the mixture being free of peroxide catalysts of polymerization, the mixture further being stabilized against premature gelation during storage by 0.1 to 2% of a compound of the formula:

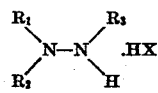

in which at least one of the radicals of the group $R_1$, $R_2$ and $R_3$ is hydrocarbon, the remaining radicals in the group being hydrogen and X being chlorine.

8. As a new composition of matter a copolymerizable mixture of (A) a polyester of a dihydric alcohol consisting of carbon, hydrogen and oxygen and a mixture of an alpha-beta ethylenically unsaturated, alpha-beta dicarboxylic acid and not more than 80% upon a molar basis of an ethylenically saturated dicarboxylic acid and (B) an ethylenically unsaturated monomer capable of cross-linking the polyester molecules at the points of unsaturation therein, the mixture being free of peroxide catalysts of polymerization, the mixture further being stabilized against premature gelation during storage by a small stabilizing amount of phenyl hydrazine hydrochloride.

9. A composition as defined in claim 8 in which the unsaturated dicarboxylic acid is maleic acid and the saturated dicarboxylic acid is phthalic acid.

10. A composition as defined in claim 8 in which the unsaturated dicarboxylic acid is fumaric acid and the saturated dicarboxylic acid is phthalic acid.

11. A method of storing a copolymerizable mixture of (A) a polyester of a dihydric alcohol consisting of carbon, hydrogen and oxygen and a mixture of an alpha-beta ethylenically unsaturated, alpha-beta dicarboxylic acid and a dicarboxylic acid free of unsaturation adapted to react by addition with vinylic monomers, the first mentioned acid constituting at least 20% upon a molar basis of the mixture of acids and (B) an ethylenically unsaturated monomer capable of cross-linking the polyester molecules at the points of unsaturation in said polyester which process comprises incorporating with the mixture in the absence of peroxide catalysts of polymerization 0.1 to 2% based upon the copolymerizable mixture of a compound of the formula:

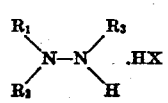

in which at least one of the radicals $R_1$, $R_2$ and $R_3$ is hydrocarbon, the remaining radicals of the group $R_1$, $R_2$ and $R_3$ being of the class consisting of hydrogen and hydrocarbon, X being halogen, the mixture being maintained free of catalysts of gelation during storage.

12. A method of storing a copolymerizable mixture of (A) a polyester of a dihydric alcohol consisting of carbon, hydrogen and oxygen and a mixture of an alpha-beta ethylenically unsaturated alpha-beta dicarboxylic acid and a dicarboxylic acid free of unsaturated valences adapted to react by addition with vinylic monomers, the first mentioned acid constituting at least 20% upon a molar basis of the mixture of acids and (B) and ethylenically unsaturated monomer capable of cross-linking the polyester molecules at the points of unsaturation in said polyester which process comprises incorporating with the mixture in the absence of peroxide catalysts of polymerization 0.1 to 2% based upon the copolymerizable mixture of phenyl hydrazine hydrochloride, the mixture being maintained free of polymerization catalysts during storage.

13. A product as defined in claim 1 in which the polyester comprises 50 parts by weight and the monomer comprises 10 to 100 parts.

14. A process as defined in claim 11 in which the polyester comprises 50 parts by weight and the monomer comprises 10 to 100 parts by weight.

15. A process as defined in claim 12 in which the polyester comprises 50 parts by weight and the monomer comprises 10 to 100 parts by weight.

16. A composition as defined in claim 4 in which the polyester comprises 50 parts by weight, the monomer comprising 10 to 100 parts by weight.

17. A composition as defined in claim 7 in which the unsaturated dicarboxylic acid is maleic acid, the saturated acid being phthalic acid.

18. A composition as defined in claim 7 in which the unsaturated dicarboxylic acid is maleic, the saturated dicarboxylic acid being phthalic, the monomer being styrene.

19. A process of forming a copolymerizable mixture of an ethylenically unsaturated monomer and an alpha-beta ethylenically unsaturated alpha-beta dicarboxylic acid polyester of a glycol, said mixture being stable against gelation at normal atmospheric temperatures for a period of at least 50 days which method comprises heating said polyester in contact with a small stabilizing amount of a hydrohalide salt of a hydrazine compound of the formula:

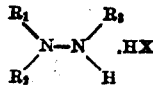

where at least one of the groups $R_1$, $R_2$, $R_3$ is hydrocarbon, the members of the groups $R_1$, $R_2$ and $R_3$ which are not hydrocarbon being hydrogen and X being halogen, until the compound goes into solution in the polyester, then adding the monomer and cooling the mixture.

20. A process as defined in claim 19 in which the hydrazine compound is phenyl hydrazine hydrochloride.

21. A process as defined in claim 19 in which the polyester is of diethylene glycol and a mixture of maleic anhydride and phthalic acid, the olefinically unsaturated monomer being styrene, the hydrazine compound being phenyl hydrazine hydrochloride.

22. In a process of forming a resinous product from a mixture of styrene and a polyester of a glycol and an alpha-beta dicarboxylic, alpha-beta ethylenically unsaturated acid, in which process the mixture is subjected to storage for a substantial period before polymerization, the steps which comprise incorporating with the mixture preliminary to said period of storage .01 to 2% of halide salt of phenyl-hydrazine, then, at the conclusion of the period of storage, incorporating into the mixture a periodic catalyst of polymerization and subsequently heating the mixture to a temperature adapted to effect copolymerization of the styrene and the polyester.

23. A process as defined in claim 22 in which the temperature of copolymerization extends 75° to 150° C. and the styrene constitutes 10 to 100 parts per 50 parts of the polyester.

EARL E. PARKER.

REFERENCES CITED

The following references are of record in the file of this patent:

UNITED STATES PATENTS

| Number | Name | Date |
|---|---|---|
| 2,247,927 | Smith | July 1, 1941 |
| 2,407,861 | Wolk | Sept. 17, 1946 |
| 2,413,257 | Soday | Dec. 24, 1946 |
| 2,429,060 | Hoover et al. | Oct. 14, 1947 |
| 2,453,666 | Kropa | Nov. 9, 1948 |
| 2,477,791 | Foster et al. | Aug. 2, 1949 |

OTHER REFERENCES

Bacon: Trans. Faraday Soc., vol. 42, pages 140, 141, 146, 147, 154 and 155 (1946).